United States Patent
Cai et al.

(10) Patent No.: US 10,892,652 B2
(45) Date of Patent: Jan. 12, 2021

(54) ADAPTIVE PING METHOD FOR WIRELESS CHARGING SYSTEM WITH WIDE CHARGE DISTANCE

(71) Applicant: Semtech Corporation, Camarillo, CA (US)

(72) Inventors: Wen Cai, Plano, TX (US); Francois Ricodeau, Dallas, TX (US)

(73) Assignee: SEMTECH CORPORATION, Camarillo, CA (US)

( * ) Notice: Subject to any disclaimer, the term of this patent is extended or adjusted under 35 U.S.C. 154(b) by 28 days.

(21) Appl. No.: 16/217,812

(22) Filed: Dec. 12, 2018

(65) Prior Publication Data
US 2020/0195064 A1 Jun. 18, 2020

(51) Int. Cl.
*H02J 50/90* (2016.01)
*H02J 50/12* (2016.01)
(Continued)

(52) U.S. Cl.
CPC .............. *H02J 50/90* (2016.02); *H02J 50/12* (2016.02); *G01S 13/90* (2013.01); *G01S 15/08* (2013.01); *G01S 17/08* (2013.01)

(58) Field of Classification Search
CPC .. H02J 50/12; H02J 50/90; H02J 5/005; H02J 7/025; H02J 17/00; B60L 53/38–39
See application file for complete search history.

(56) References Cited

U.S. PATENT DOCUMENTS

| | | |
|---|---|---|
| 5,874,938 A | 2/1999 | Marten |
| 6,094,038 A | 7/2000 | Lethellier |
| | (Continued) | |

FOREIGN PATENT DOCUMENTS

| | | |
|---|---|---|
| CN | 107919322 | 4/2018 |
| EP | 2387127 | 11/2011 |
| | (Continued) | |

OTHER PUBLICATIONS

Notification of Transmittal of the International Search Report and the Written Opinion of the International Search Authority—The European Patent Office—dated Feb. 4, 2020 for International Application No. PCT/US2019/064456, 14 pages.

*Primary Examiner* — Daniel J Cavallari
*Assistant Examiner* — David A Shiao
(74) *Attorney, Agent, or Firm* — Jackson Walker LLP; Christopher J. Rourk

(57) ABSTRACT

A method for controlling power delivery from a transmitter to a receiver, comprising generating a control at a processor to actuate a distance measurement device. Transmitting the control to the distance measurement device. Activating the distance measurement device to measure a distance between a transmitter and a receiver. Transmitting a data packet from the distance measurement device to the processor that contains a plurality of data fields that have a value that represents the distance. Determining whether the distance is less than a predetermined threshold using the processor. Generating an error signal if the distance is less than the predetermined threshold to prevent the transmitter from generating an electromagnetic field that would cause damage to the receiver. Setting a ping signal strength as a function of the distance. Generating an electromagnetic field as a function of the ping signal strength.

20 Claims, 3 Drawing Sheets

(51) Int. Cl.
*G01S 13/90* (2006.01)
*G01S 15/08* (2006.01)
*G01S 17/08* (2006.01)

(56) References Cited

U.S. PATENT DOCUMENTS

| | | | |
|---|---|---|---|
| 6,511,764 B1 | 1/2003 | Marten | |
| 6,518,725 B2 | 2/2003 | Marten | |
| 6,836,095 B2 | 12/2004 | Fogg | |
| 7,808,220 B2 | 10/2010 | Rader et al. | |
| 7,843,171 B2 | 11/2010 | Schroeder et al. | |
| 9,871,387 B1 | 1/2018 | Bell et al. | |
| 10,099,561 B1* | 10/2018 | Ananthanarayanan | B64C 39/024 |
| 2006/0145673 A1 | 7/2006 | Fogg et al. | |
| 2010/0244580 A1* | 9/2010 | Uchida | H02J 5/005 307/104 |
| 2012/0098330 A1* | 4/2012 | Ichikawa | B60L 53/60 307/9.1 |
| 2012/0306265 A1* | 12/2012 | Yamamoto | H04B 5/0037 307/9.1 |
| 2013/0033248 A1 | 2/2013 | Granger | |
| 2013/0062959 A1 | 3/2013 | Lee et al. | |
| 2015/0260835 A1* | 9/2015 | Widmer | G01S 13/04 342/27 |
| 2015/0270723 A1* | 9/2015 | Kamata | H02J 50/90 307/104 |
| 2018/0102677 A1* | 4/2018 | Tsai | H02J 50/12 |
| 2018/0120910 A1 | 5/2018 | Farkas et al. | |
| 2019/0089417 A1 | 3/2019 | Teggatz et al. | |
| 2019/0319494 A1* | 10/2019 | Park | H02J 7/02 |
| 2019/0372402 A1* | 12/2019 | Mese | H02J 50/12 |
| 2020/0021138 A1* | 1/2020 | Yeo | H02J 50/20 |

FOREIGN PATENT DOCUMENTS

| | | |
|---|---|---|
| EP | 3176910 | 6/2017 |
| KR | 20150066539 | 6/2015 |
| WO | 2001/056062 | 8/2001 |

\* cited by examiner

ADAPTIVE PING METHOD FOR WIRELESS CHARGING SYSTEM WITH WIDE CHARGE DISTANCE

TECHNICAL FIELD

The present disclosure relates generally to wireless charging systems, and more specifically to an adaptive ping method for a wireless charging system with a wide charge distance.

BACKGROUND OF THE INVENTION

Wireless charging systems are known, but suffer from numerous disadvantages. For example, overvoltages can be generated that damage receivers, which causes the field to be unduly limited and which restricts the range of charging distance.

SUMMARY OF THE INVENTION

A method for controlling power delivery from a transmitter to a receiver is disclosed that includes generating a control at a processor to actuate a distance measurement device and transmitting the control to the distance measurement device. The distance measurement device is activated to measure a distance between a transmitter and a receiver, and a data packet is transmitted from the distance measurement device to the processor that contains a plurality of data fields that have a value that represents the distance. It is determined whether the distance is less than a predetermined threshold using the processor, and an error signal is generated if the distance is less than the predetermined threshold to prevent the transmitter from generating an electromagnetic field that would cause damage to the receiver. A ping signal strength is set as a function of the distance, and an electromagnetic field is generated as a function of the ping signal strength.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
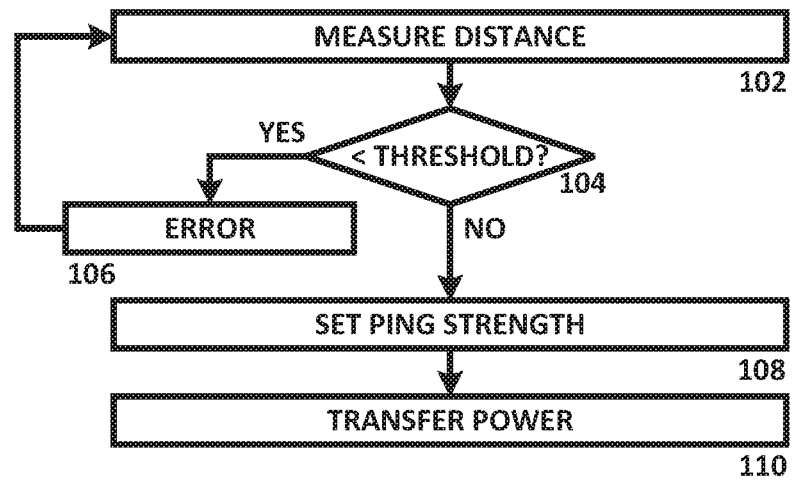
FIG. 1 is a flow chart of an algorithm for controlling a wireless charging transmitter system with direct separation measurement, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Wireless charging systems often use a sounding signal or "ping" to determine a distance between transmitters and receivers. However, the power levels of the ping signal can damage a receiver if it is too close. The present disclosure provides a system and method for adjusting the power level of the ping signal as a function of an alternative distance determination protocol, such as one that uses radar, infrared, ultrasonic or other suitable devices. Once the approximate distance between the transmitter and receiver is known, the ping signal strength can be adjusted, to prevent the receiver from being damaged by the ping signal.

FIG. 1 is a flow chart of an algorithm 100 for controlling a wireless power transfer system with direct gap distance measurement, in accordance with an example embodiment of the present disclosure. Algorithm 100 can be implemented in hardware or a suitable combination of hardware and software, and can be one or more lines of code that have been compiled and linked to a controller of a wireless power transmitter device or other suitable devices. While algorithm 100 is shown as a flow chart, one of skill in the art will understand that it can also or alternatively be implemented using objects, state diagrams or in other suitable manners.

Algorithm 100 begins at 102, where distance is measured. In one example embodiment, one or more control commands can be provided from a controller to a distance measuring device, such as a synthetic aperture radar system, an infrared distance measurement device, an ultrasonic distance measurement device or other suitable devices. The distance measurement device can generate one or more data packets in response that include distance measurement data, can transmit the data packets to the controller or can perform other suitable functions. The algorithm then proceeds to 104.

At 104, it is determined whether the distance is less than a threshold. In one example embodiment, the controller can compare the distance data received at 102 with a stored threshold value, and if the distance data is less than the stored threshold, the algorithm proceeds to 106, where error data is generated. In one example embodiment, the error data causes the controller to stop transmission of power to a remote device, such as to prevent the generation of overvoltages in the remote device. The threshold can be constant or variable, and the algorithm can cause the controller to leave a power transfer phase to avoid the generation of an overvoltage condition on the receiver side, which could damage the receiver circuit. Likewise, other suitable processes can be implemented. If it is determined that the distance is not less than the stored threshold at 106, the algorithm proceeds to 108.

At 108, a ping signal strength is adjusted as a function of the gap distance data. In one example embodiment, the ping signal strength can be adjusted based on a linear or non-linear relationship between the separation distance between the transmitter and the receiver and a preferred ping strength, as a function of empirical data or in other suitable manners. The algorithm then proceeds to 110, where the controller actuates a power transfer device having an inductor, antenna or other suitable transmitter.

In addition, the algorithm can return to step 102 after step 110, such as to periodically determine whether a distance has changed. In one example embodiment, the charging process can cause the power transfer to be temporarily suspended or otherwise interrupted, even if the charging process independently monitors signal strength levels, such that independent verification of ping strength or distance can be used to prevent damage.

Figure 2:
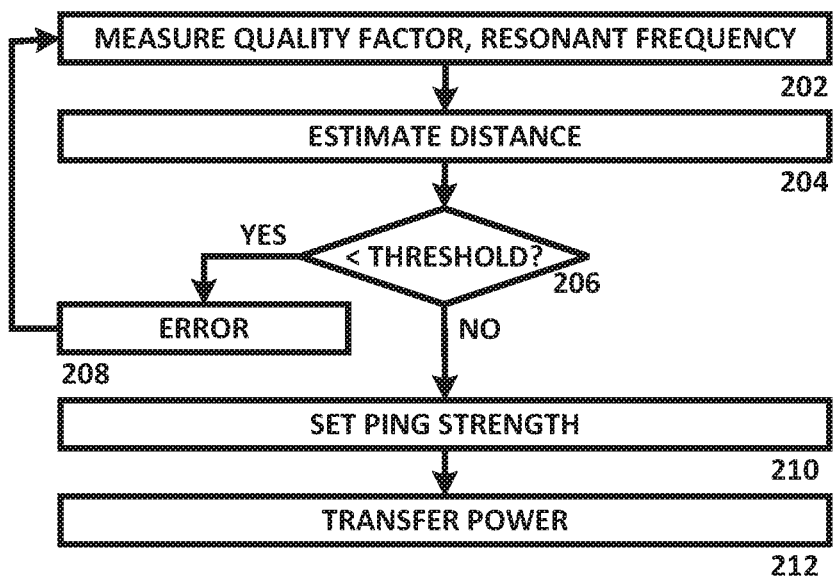
FIG. 2 is a flow chart of an algorithm for controlling a wireless charging transmitter system with indirect separation measurement, in accordance with an example embodiment of the present disclosure.

FIG. 2 is a flow chart of an algorithm 200 for controlling a wireless power transfer system with indirect separation measurement, in accordance with an example embodiment of the present disclosure. Algorithm 200 can be implemented in hardware or a suitable combination of hardware and software, and can be one or more lines of code that have been compiled and linked to a controller of a wireless power transmitter device or other suitable devices. While algorithm 200 is shown as a flow chart, one of skill in the art will understand that it can also or alternatively be implemented using objects, state diagrams or in other suitable manners.

Algorithm 200 begins at 202, where a quality factor, resonant frequency or other suitable circuit parameters are measured. In one example embodiment, a controller can cause the quality factor, resonant frequency or other data to be determined by actuating a test circuit, by adjusting an applied voltage and measuring a resulting current or in other suitable manners. The quality factor data, resonant frequency data or other suitable data can also or alternatively be stored in the controller, transmitted to the controller or otherwise saved for subsequent data processing. The algorithm then proceeds to 204.

At 204, a distance is estimated from the quality factor data, resonant frequency data or other suitable data. In one example embodiment, the quality factor data, resonant frequency data or other suitable data can be associated with a calculated or empirically determined distance curve. The distance estimation can generate one or more data packets in response that include distance estimate data, can transmit the data packets to the controller or can perform other suitable functions. The algorithm then proceeds to 206.

At 206, it is determined whether the distance is less than a threshold. In one example embodiment, the controller can compare the distance data received at 204 with a stored threshold value, and if the distance data is less than the stored threshold, the algorithm proceeds to 208 where error data is generated. In one example embodiment, the error data causes the controller to stop transmission of power to a remote device, such as to prevent the generation of over-voltages in the remote device. The threshold can be constant or variable, and the algorithm can cause the controller to leave a power transfer phase to avoid the overvoltage condition on receiver side, which could damage the receiver circuit. Likewise, other suitable processes can be implemented. If it is determined that the distance is not less than the stored threshold at 206, the algorithm proceeds to 210.

At 210, a ping signal strength is adjusted as a function of the distance data. In one example embodiment, the ping signal strength can be adjusted based on a linear or non-linear relationship between distance and preferred ping strength, as a function of empirical data or in other suitable manners. The algorithm then proceeds to 212, where the controller actuates a power transfer device having an inductor, antenna or other suitable transmitter.

In addition, the algorithm can return to step 202 after step 210 as discussed above in regards to steps 110 and 102, such as to periodically determine whether a distance has changed.

Figure 3:
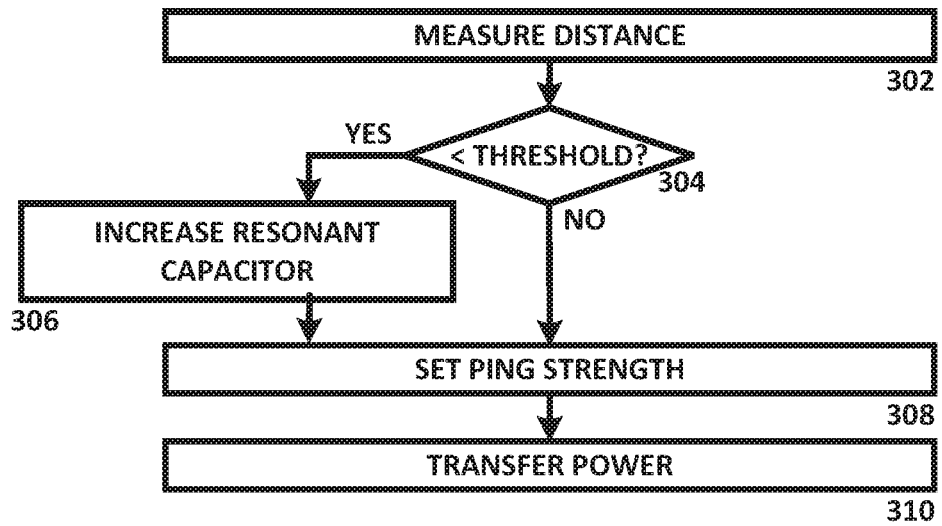
FIG. 3 is a flow chart of an algorithm for controlling a wireless charging transmitter system with direct separation measurement by adjusting resonance, in accordance with an example embodiment of the present disclosure.

FIG. 3 is a flow chart of an algorithm 300 for controlling a wireless power transfer system with direct separation measurement by adjusting resonance, in accordance with an example embodiment of the present disclosure. Algorithm 300 can be implemented in hardware or a suitable combination of hardware and software, and can be one or more lines of code that have been compiled and linked to a controller of a wireless power transmitter device or other suitable devices. While algorithm 300 is shown as a flow chart, one of skill in the art will understand that it can also or alternatively be implemented using objects, state diagrams or in other suitable manners.

Algorithm 300 begins at 302, where distance is measured. In one example embodiment, one or more control commands can be provided from a controller to a distance measuring device, such as a synthetic aperture radar system, an infrared distance measurement device, an ultrasonic distance measurement device or other suitable devices. The distance measurement device can generate one or more data packets in response that include distance measurement data, can transmit the data packets to the controller or can perform other suitable functions. The algorithm then proceeds to 304.

At 304, it is determined whether the distance is less than a threshold. In one example embodiment, the controller can compare the distance data received at 302 with a stored threshold value, and if the distance data is less than the stored threshold, the algorithm proceeds to 306, where a capacitor value is increased. In one example embodiment, the controller can increase the capacitor value to improve power transfer efficiency, to prevent the generation of over-voltages in the remote device, or for other suitable purposes. If it is determined that the distance is not less than the stored threshold at 304, the algorithm proceeds to 308.

At 308, a ping signal strength is adjusted as a function of the distance data. In one example embodiment, the ping signal strength can be adjusted based on a linear or non-linear relationship between distance and preferred ping strength, as a function of empirical data or in other suitable manners. The algorithm then proceeds to 310, where the controller actuates a power transfer device having an inductor, antenna or other suitable transmitter.

In addition, the algorithm can return to step 302 after step 310 as discussed above in regards to steps 110 and 102, such as to periodically determine whether a distance has changed.

Figure 4:
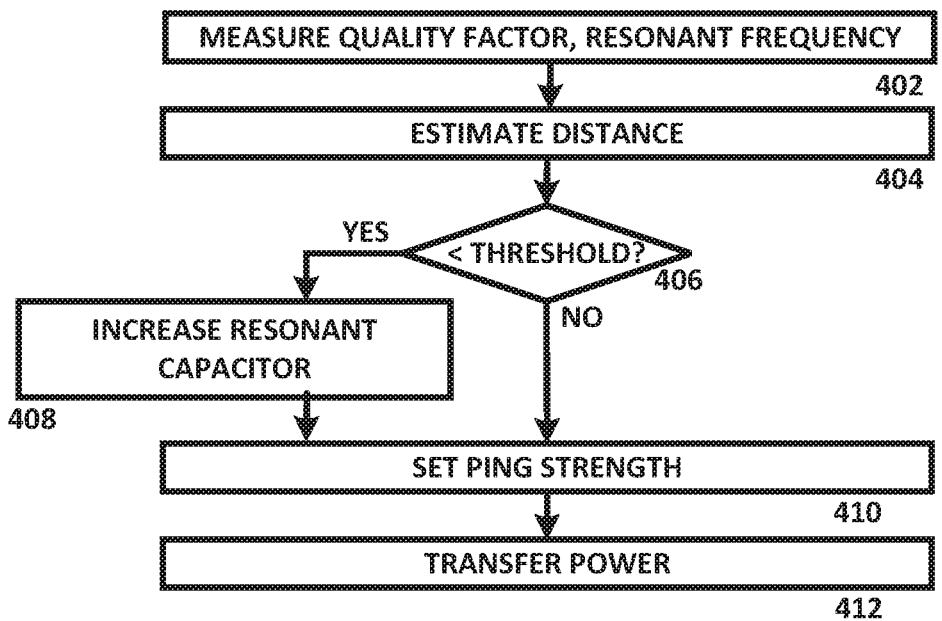
FIG. 4 is a flow chart of an algorithm for controlling a wireless charging transmitter system with indirect separation measurement by adjusting resonance, in accordance with an example embodiment of the present disclosure.

FIG. 4 is a flow chart of an algorithm 400 for controlling a wireless power transfer system with indirect separation measurement by adjusting resonance, in accordance with an example embodiment of the present disclosure. Algorithm 400 can be implemented in hardware or a suitable combination of hardware and software, and can be one or more lines of code that have been compiled and linked to a controller of a wireless power transmitter device or other suitable devices. While algorithm 400 is shown as a flow chart, one of skill in the art will understand that it can also or alternatively be implemented using objects, state diagrams or in other suitable manners.

Algorithm 400 begins at 402, where a quality factor, resonant frequency or other suitable circuit parameters are measured. In one example embodiment, a controller can cause the quality factor, resonant frequency or other data to be determined by actuating a test circuit, by adjusting an applied voltage and measuring a resulting current or in other suitable manners. The quality factor data, resonant frequency data or other suitable data can also or alternatively be stored in the controller, transmitted to the controller or otherwise saved for subsequent data processing. The algorithm then proceeds to 404.

At 404, a distance is estimated from the quality factor data, resonant frequency data or other suitable data. In one example embodiment, the quality factor data, resonant frequency data or other suitable data can be associated with a calculated or empirically determined distance curve. The distance estimation can generate one or more data packets in response that include distance estimate data, can transmit the data packets to the controller or can perform other suitable functions. The algorithm then proceeds to 406.

At 406, it is determined whether the distance is less than a threshold. In one example embodiment, the controller can compare the distance data received at 404 with a stored threshold value, and if the distance data is less than the stored threshold, the algorithm proceeds to 408, where a capacitor value is increased. In one example embodiment, the controller can increase the capacitor value to improve power transfer efficiency, to prevent the generation of overvoltages in the remote device, or for other suitable purposes. If it is determined that the distance is not less than the stored threshold at 406, the algorithm proceeds to 410.

At 410, a ping signal strength is adjusted as a function of the distance data. In one example embodiment, the ping signal strength can be adjusted based on a linear or non-linear relationship between distance and preferred ping strength, as a function of empirical data or in other suitable manners. The algorithm then proceeds to 412, where the controller actuates a power transfer device having an inductor, antenna or other suitable transmitter.

In addition, the algorithm can return to step 402 after step 412 as discussed above in regards to steps 110 and 102, such as to periodically determine whether a distance has changed.

Figure 5:
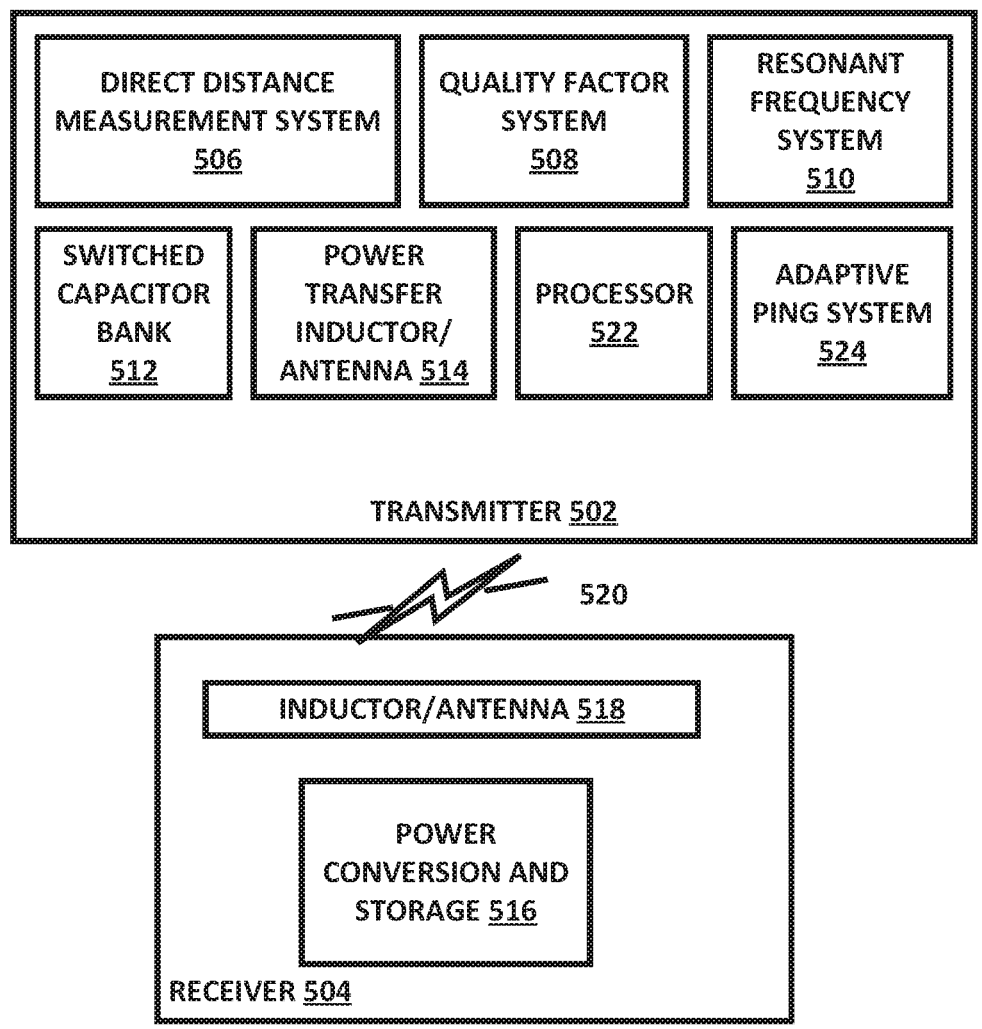
FIG. 5 is a diagram of a system with algorithmic control of wireless charging transmitter, in accordance with an example embodiment of the present disclosure.

FIG. 5 is a diagram of a system 500 with algorithmic control of wireless power transfer, in accordance with an example embodiment of the present disclosure. System 500 includes transmitter 502, which further includes direct distance measurement system 506, quality factor system 508, resonant frequency system 510, switched capacitor bank 512, processor 522, adaptive ping system 524 and power transfer inductor/antenna 514, and receiver 504, which further includes power conversion and storage 516 and inductor/antenna 518, each of which can be implemented in hardware or a suitable combination of hardware and software.

Transmitter 502 can be a wireless power transmitter that is configured to provide charging energy to one wireless power receiver, such as a cell phone, a laptop computer, a table computer or other suitable devices. In one example embodiment, transmitter 502 includes a power source such as a battery or electrical outlet plug, and can convert the DC or AC power into electromagnetic energy, such as by providing alternating current to a coil to generate a time varying magnetic field. Transmitter 502 can also include a base, cradle or other suitable physical component that can provide a suitable mechanical support to a wireless power receiver.

Direct distance measurement system 506 can be implemented as a synthetic aperture radar system, an infrared distance sensor, an ultrasonic distance sensor or other suitable components that generate an optical, electromagnetic, audio or other suitable signal and that measure a time of flight of a reflected signal or other suitable indicators to determine a distance between a transmitter and a receiver. The receiver can have a predetermined component that generates a reflection, or can use other suitable indexing devices to ensure that accurate distance data is generated. Direct distance measurement system 506 can operate continuously, upon receipt of a command from a processor that is under algorithmic control, or in other suitable manners, and can generate a data message such as a packet having a predetermined data format that includes the measured distance data, and can transmit the data message to the processor for subsequent processing.

Quality factor system 508 can be implemented as a resonator "ring down" system or other suitable components that generate data that defines a quality factor of a transmitter antenna or inductor by applying a square wave voltage from a voltage source and measuring a decay current with an ammeter, a frequency analyzer or other suitable devices. Quality factor system 508 can operate continuously, upon receipt of a command from a processor that is under algorithmic control, or in other suitable manners, can generate a data message such as a packet having a predetermined data format that includes the measured quality factor data, can transmit the data message to the processor for subsequent processing, and can perform other suitable functions.

Resonant frequency system 510 can be implemented as an adjustable frequency voltage source or other suitable components that generate a variable frequency input to determine one or more resonant frequencies of a transmitter antenna or inductor, such as by determining frequencies at which the antenna or inductor apparent impedance becomes very small. Resonant frequency system 510 can operate continuously, upon receipt of a command from a processor that is under algorithmic control, or in other suitable manners, can generate a data message such as a packet having a predetermined data format that includes the measured resonant frequency data, and can transmit the data message to the processor for subsequent processing.

Switched capacitor bank 512 can be implemented as a plurality of capacitors that have a plurality of associated switching devices that allow the capacitance value of the plurality of capacitors as seen in a circuit to be controllably varied in response to control data. In one example embodiment, switched capacitor bank 512 can receive a control data packet having a predetermined frame structure and can change the settings of the plurality of switches to change the capacitance value of the capacitor bank, such as by opening a predetermined switch if it has a corresponding value of "0" in the control data packet, by closing a predetermined switch if it has a corresponding value of "1" in the control data packet, or in other suitable manners.

Processor 522 includes a central processing unit, memory devices, input/output devices and other suitable components to allow one or more algorithms to be installed in and to control the operation of processor 522. In one example embodiment, source code can be compiled into a machine-readable format and then linked by a linker program to processor 522 to install the algorithms into predetermined memory locations, to allow the central processing unit to read and write data to the memory devices, input/output devices and other suitable components, and to perform arithmetic operations on the data, so as to read data from components of system 500 that is transmitted to or obtained by processor 522, to transmit controls and data to components of system 500 and for other suitable purposes.

Adaptive ping system 524 can be implemented as one or more algorithms operating on processor 522 that cause processor 522 to generate a ping signal having predetermined signal strength parameters, predetermined duration parameters, predetermined transmission time parameters or other suitable parameters. In one example embodiment, adaptive ping system 524 can generate the ping signal as a function of a measured distance between a transmitter and a receiver, where the ping signal can have a linear or nonlinear relationship to the distance. If the distance between the transmitter and the receiver falls below a predetermined threshold, then an error signal can be generated that causes the adaptive ping system 524 to suspend generation of the ping signal. Likewise, other suitable functions can also or alternatively be provided.

Power transfer inductor/antenna 514 is configured to generate electromagnetic fields that cause energy to be transferred from transmitter 502 to receiver 504. In one example embodiment, power transfer inductor/antenna 514 can receive a current signal having a predetermined frequency and magnitude, and can generate the electromagnetic field in response to that current signal.

Receiver 504 can be a wireless power receiver that is configured to receive charging energy, such as for a cell phone, a laptop computer, a table computer or other suitable devices. In one example embodiment, receiver 504 includes an inductor/antenna 518 and can convert electromagnetic energy into a DC or AC voltage and current. Receiver 504 can also be configured to fit in a base, cradle or other suitable physical component that can provide a suitable mechanical support to receiver 504. Receiver 504 can store power to power conversion and storage 516 and can use stored power from power conversion and storage 516 to operate.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for controlling power delivery, comprising:
   a) generating a control data at a processor to actuate a distance measurement device;
   b) transmitting the control data to the distance measurement device;
   c) activating the distance measurement device to measure a distance between a transmitter and a receiver;
   d) transmitting a data packet from the distance measurement device to the processor that contains a plurality of data fields that have a value that represents the distance;
   e) determining whether the distance is less than a predetermined threshold using the processor;
   f) generating an error signal when the distance is less than the predetermined threshold that causes the processor to prevent the transmitter from generating an electromagnetic field and avoid causing damage to the receiver; and
   g) setting a ping signal strength as a function of the distance and generating, by the transmitter, the electromagnetic field as a function of the ping signal strength when the distance is not less than the predetermined threshold.

2. The method of claim 1 wherein the distance measuring device comprises a synthetic aperture radar.

3. The method of claim 1 wherein the distance measuring device comprises an infrared distance measurement device.

4. The method of claim 1 wherein the distance measuring device comprises an ultrasonic distance measurement device.

5. The method of claim 1 wherein the distance measuring device is configured to measure a signal quality factor in response to activation.

6. The method of claim 1 wherein the distance measuring device is configured to measure a resonant frequency in response to activation.

7. The method of claim 1 wherein setting the ping signal strength as the function of the distance comprises changing one or more switch settings in a switched capacitor bank.

8. The method of claim 1 further comprising repeating steps a) through e) after step f) until the distance is not less than the predetermined threshold.

9. A system for controlling power delivery, comprising:
   a distance measuring device;
   a processor coupled to the distance measuring device and configured to actuate the distance measurement device;
   the distance measurement device configured to measure a distance between a transmitter and a receiver and to transmit a data packet to the processor that contains a plurality of data fields that have a value that represents the distance;
   the processor configured to determine whether the distance is less than a predetermined threshold and to generate an error signal when the distance is less than the predetermined threshold that causes the processor to prevent the transmitter from generating an electromagnetic field and avoid causing damage to the receiver; and
   a ping signal generator configured to generate a ping signal having a ping signal strength as a function of the distance and the transmitter configured to generate the electromagnetic field as a function of the ping signal strength when the distance is not less than the predetermined threshold.

10. The system of claim 9 wherein the distance measuring device comprises a synthetic aperture radar.

11. The system of claim 9 wherein the distance measuring device comprises an infrared distance measurement device.

12. The system of claim 9 wherein the distance measuring device comprises an ultrasonic distance measurement device.

13. The system of claim 9 wherein the distance measuring device is configured to measure a signal quality factor in response to activation.

14. The system of claim 9 wherein the distance measuring device is configured to measure a resonant frequency in response to activation.

15. The system of claim 9 further comprising a switched capacitor bank that is configured to adjust the ping signal strength.

16. The system of claim 9 wherein the processor is configured to repeat the actuation of the distance measuring device if the error signal is generated.

17. A method for controlling power delivery, comprising:
   a) generating a control data at a processor to actuate a distance measurement device;
   b) transmitting the control data to the distance measurement device;
   c) activating the distance measurement device to measure a distance between a transmitter and a receiver;
   d) transmitting a data packet from the distance measurement device to the processor that contains a plurality of data fields that have a value that represents the distance;
   e) determining whether the distance is less than a predetermined threshold using the processor;
   f) generating an error signal when the distance is less than the predetermined threshold that causes the processor to prevent the transmitter from generating an electromagnetic field and avoid causing damage to the receiver; and
   g) setting a ping signal strength as a function of the distance and generating, by the transmitter, the electromagnetic field as a function of the ping signal strength when the distance is not less than the predetermined threshold;
   wherein the distance measuring device is configured to measure a signal quality factor in response to activation and wherein setting the ping signal strength as the function of the distance comprises changing one or more switch settings in a switched capacitor bank.

18. The method of claim 17 wherein the distance measuring device comprises an infrared distance measurement device.

19. The method of claim 17 wherein the distance measuring device comprises an ultrasonic distance measurement device.

20. The method of claim 17 wherein the distance measuring device is configured to measure a resonant frequency in response to activation.

* * * * *